UNITED STATES PATENT OFFICE.

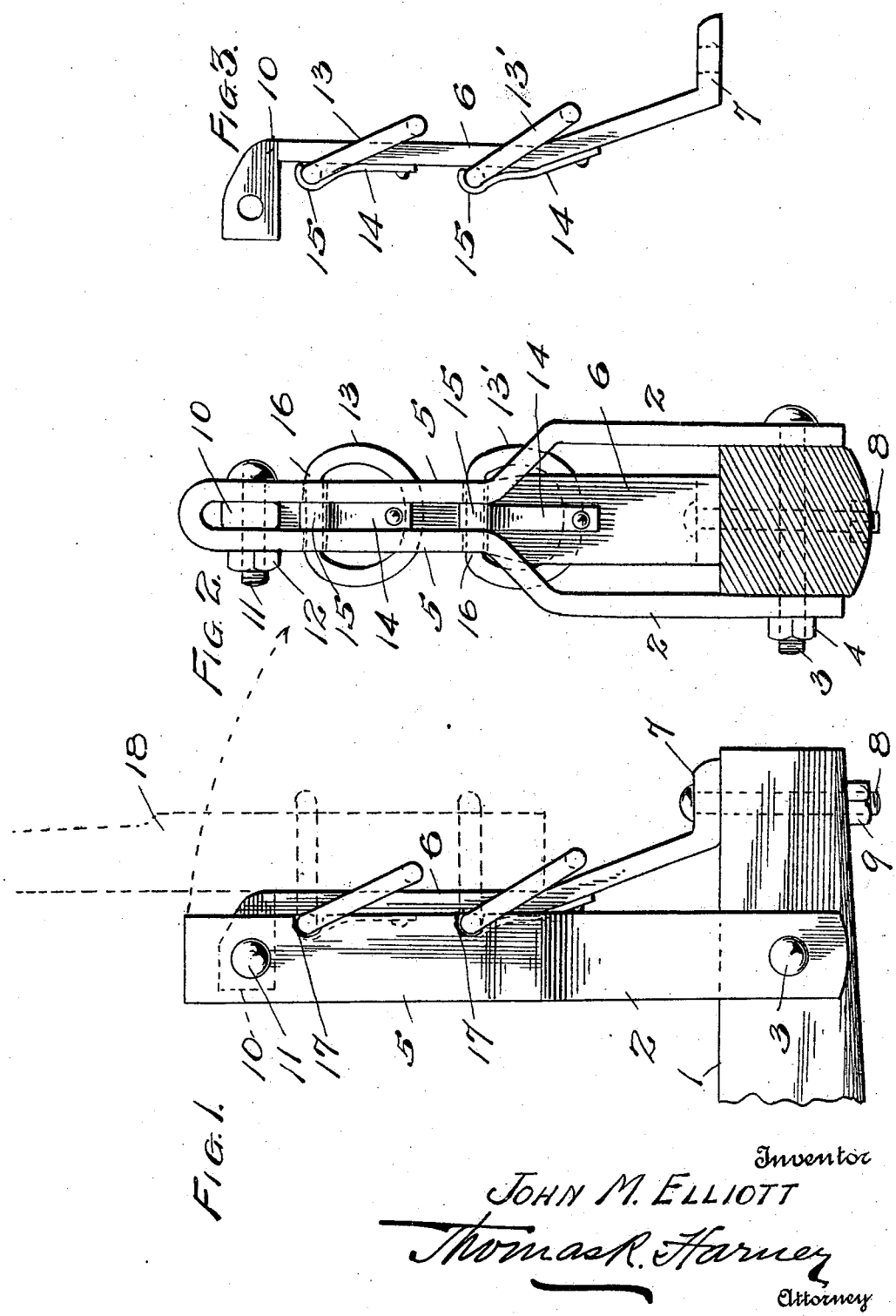

JOHN M. ELLIOTT, OF SILVER, SOUTH CAROLINA.

WAGON STANDARD.

1,412,106.  Specification of Letters Patent.  Patented Apr. 11, 1922.

Application filed May 9, 1921. Serial No. 467,855.

*To all whom it may concern:*

Be it known that I, JOHN M. ELLIOTT, a citizen of the United States of America, residing at Silver, in the county of Clarendon and State of South Carolina, have invented certain new and useful Improvements in Wagon Standards, of which the following is a specification.

My present invention relates to improvements in wagon standards adapted especially for use with wagons, automobile trucks, and other vehicles, and designed primarily as a strong, durable, and well braced device for preventing shifting of loads carried by the vehicle. And the invention contemplates an improved standard which is capable of facile manipulation when turned upright to operative position, and may with equal facility be turned down with relation to the bolster when not required for use.

To this end the invention consists in certain novel combinations and arrangements of parts involving a specially adapted standard in combination with a specially constructed brace member whereby the standard is well braced and held in rigid position for use, and the staple rings, which are conveniently carried by the brace are adapted not only for supporting the added stake, but also co-act with the brace and standard in forming a rigid and fixed upright for performing the required functions of the standard.

In the accompanying drawings I have illustrated one complete example of the physical embodiment of my invention, wherein the parts are combined and arranged according to the best mode I have thus far devised for the practical application of the principles of my invention.

Figure 1 is view in side elevation of one of the several standards utilized on a wagon or other vehicle, constructed according to my invention.

Figure 2 is a view as seen from the left of Figure 1 showing the bolster in cross section.

Figure 3 is a side view of the brace, detached showing the staple rings carried by the brace.

In the preferred form of the invention as shown in the drawings I have illustrated one end of a transverse bolster as generally used with wagons, trucks and similar vehicles, and depicted in connection therewith the standard, formed of strap iron of the required weight and size, and fashioned in the form of a yoke with spaced side arms 2, 2, which, at their ends are perforated for the reception of a bolt 3 which extends through an opening in the bolster and is secured by the nut 4. As indicated in Figure 1, the bolt 3 may form a pivot for the standard to swing on in the direction of the dotted line, and the spaced side arms 2 2 of the yoke or standard, as seen in Figure 2, extend upwardly a sufficient distance to permit the standard to swing around and down over the end of the bolster, in the direction of the dotted curved line in Figure 1. Thus, when not in use, or required, the standard may be swung around and be permitted to hang from the bolt 3 below the bolster, leaving the upper surface of the bolster unobstructed.

Approximately midway of the height of the standard the side arms 2 2 are brought closer together to form parallel arms 5, 5, and the upper end of the standard is formed as a bend, thus providing of a single piece of strap iron a standard well adapted for pivotal connection with the bolster, capable of being erected to upright or normal position, and insuring an efficient means for confining the load on the vehicle when braced as will be described.

The brace 6 is a piece of strap iron of required size and strength, located at the outer side of the standard and secured to the bolster by means of the perforated lug or foot 7 through which a bolt 8 is passed, the bolt also passing vertically through an opening provided therefor in the bolster, and secured by a nut 9. At its lower end the brace is somewhat offset, as shown in Figures 1 and 3 to afford a wide base for supporting the standard in position perpendicular to the bolster, and at its upper end an angular lug 10 is fashioned on the brace, which fits into the upper end, beneath the bend in the standard, to make a close joint. The lug 10 and the two arms 5 5 of the standard are perforated for the reception of a bolt 11, which is passed therethrough and secured by a nut 12 to form a rigid connection with the standard, which is thus supported at the three points 3, 8, and 10, and held firmly for performing its required functions.

As required the bolts 8 and 10 may readily be removed and the brace element of the standard may be withdrawn, as for instance when it is desired to swing the standard out of normal position, and the withdrawal of the bolts 8 and 10 may be accomplished with facility, by first removing the securing nuts 9 and 12.

The staple rings 13 and 13' are positioned for use on the brace and are detachably carried thereby through the instrumentality of the pair of flat springs 14, each having a curved hook 15 to engage over the respective rings, each of which is provided with a straight or flattened portion 16. The upper or hooked ends of these springs form retaining latches for the rings, and it will readily be apparent that should a ring be broken, the defective element may quickly be withdrawn from the latch and a new ring replaced in its stead. When in use these rings are seated in notches 17, 17, arranged in pairs and alined in the edges of the arms 5 5 of the yoke. Thus in dotted lines in Figure 1 the staple 18 is passed through the rings as they stand out in horizontal position, the lower end of the staple resting upon the offset of the brace, and the rings or their straight portions 16 are supported in the alined notches 17 of the standard and firmly held therein by the brace 6. The retaining hooks 15 of the latches are positioned in order that they will be alined between the notches 17 of the standard, and the latches are of such a width as to permit them to pass freely in between the two arms 5 5 of the standard. In this manner the springs are shielded within the yoke forming the standard, and also protected by the brace itself. When the staple is not in use, the rings hang from the notches 17 of the standard, as in Figures 1 and 2, and when the brace is withdrawn from the standard the rings are retained in the hooked latches as in Figure 3 to prevent their displacement or loss.

From the above description it is believed the meritorious features of my invention will be apparent, and that I have provided a device which fulfills the objects set forth as the purpose of my invention.

Having thus fully described my invention, what I claim as new and desire to secure by Letters Patent is—

1. The combination in a turn-down standard with a single piece yoke, a bolster, and a securing bolt adapted to form a pivot for the turn-down standard, of a brace secured to the bolster and secured to said yoke, staple rings and means on the brace for retaining said rings, and means on the yoke for receiving said rings, as described.

2. The combination with a bolster of a turn-down standard comprising a yoke with spaced lower arms and a bolt adapted to form a pivot and for securing said arms to the bolster, said standard having closer spaced upper arms with notched edges, a brace bolted to the bolster, a securing lug on the upper end of the brace and a bolt securing said lug within the standard, spring latches secured to said brace and staple rings retained therein, and said rings having straight portions to seat in said notched edges, for the purpose described.

In testimony whereof I have affixed my signature.

JOHN M. ELLIOTT.